(No Model.) 4 Sheets—Sheet 1.
W. H. DODGE & G. PHILION.
LATHE.
No. 359,853. Patented Mar. 22, 1887.
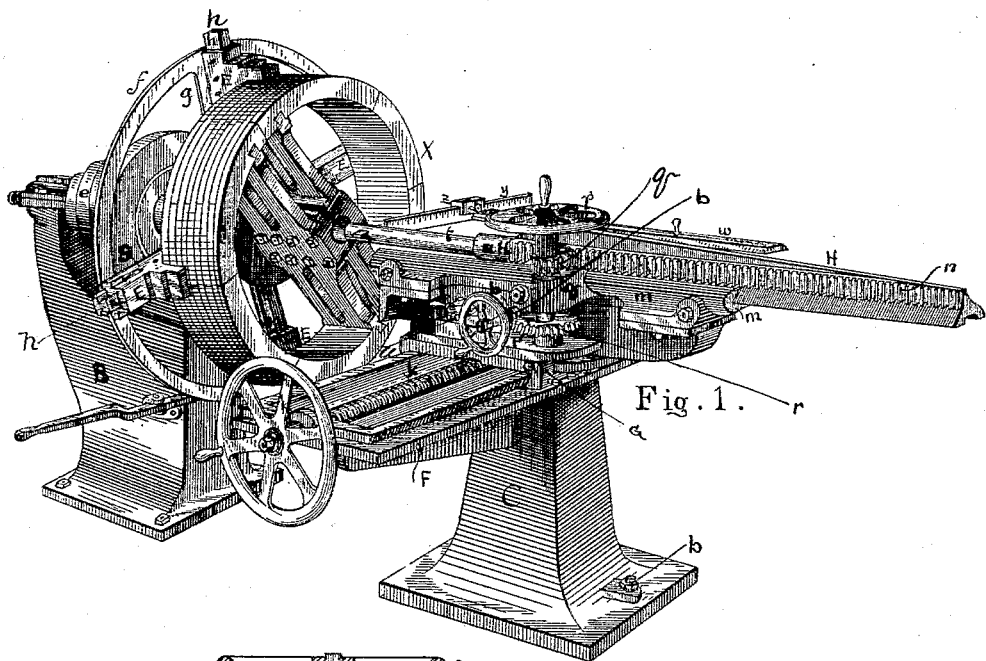
Fig. 1.
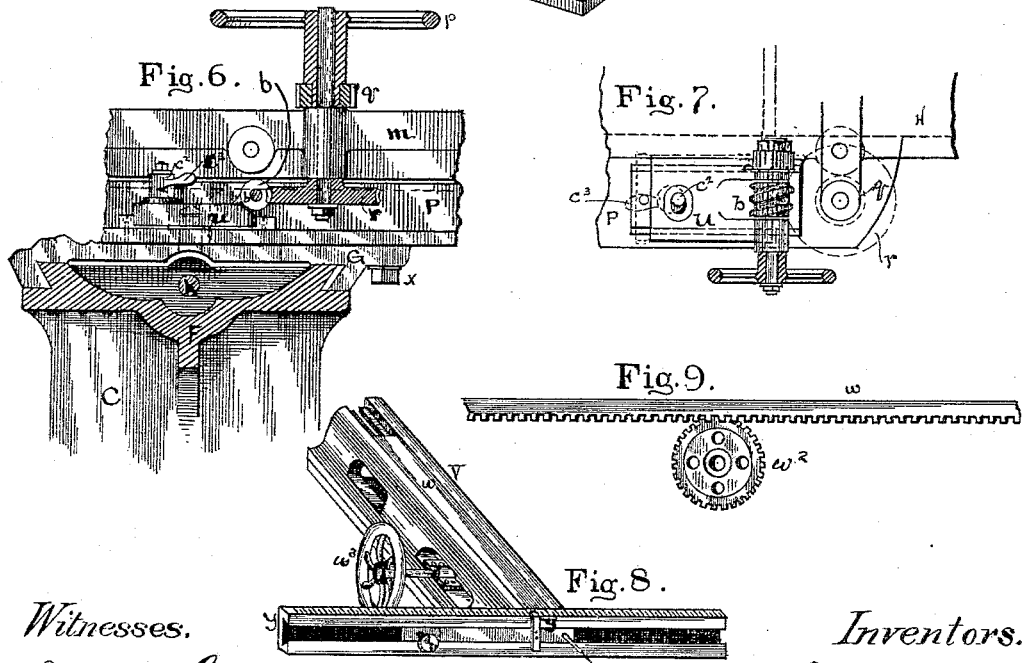
Fig. 6.
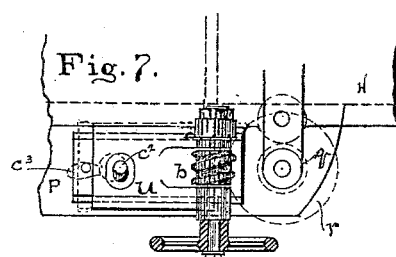
Fig. 7.
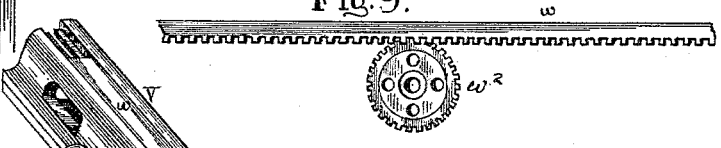
Fig. 9.
Fig. 8.
Witnesses. Inventors.

(No Model.) 4 Sheets—Sheet 2.

W. H. DODGE & G. PHILION.
LATHE.

No. 359,853. Patented Mar. 22, 1887.

Witnesses. Inventors

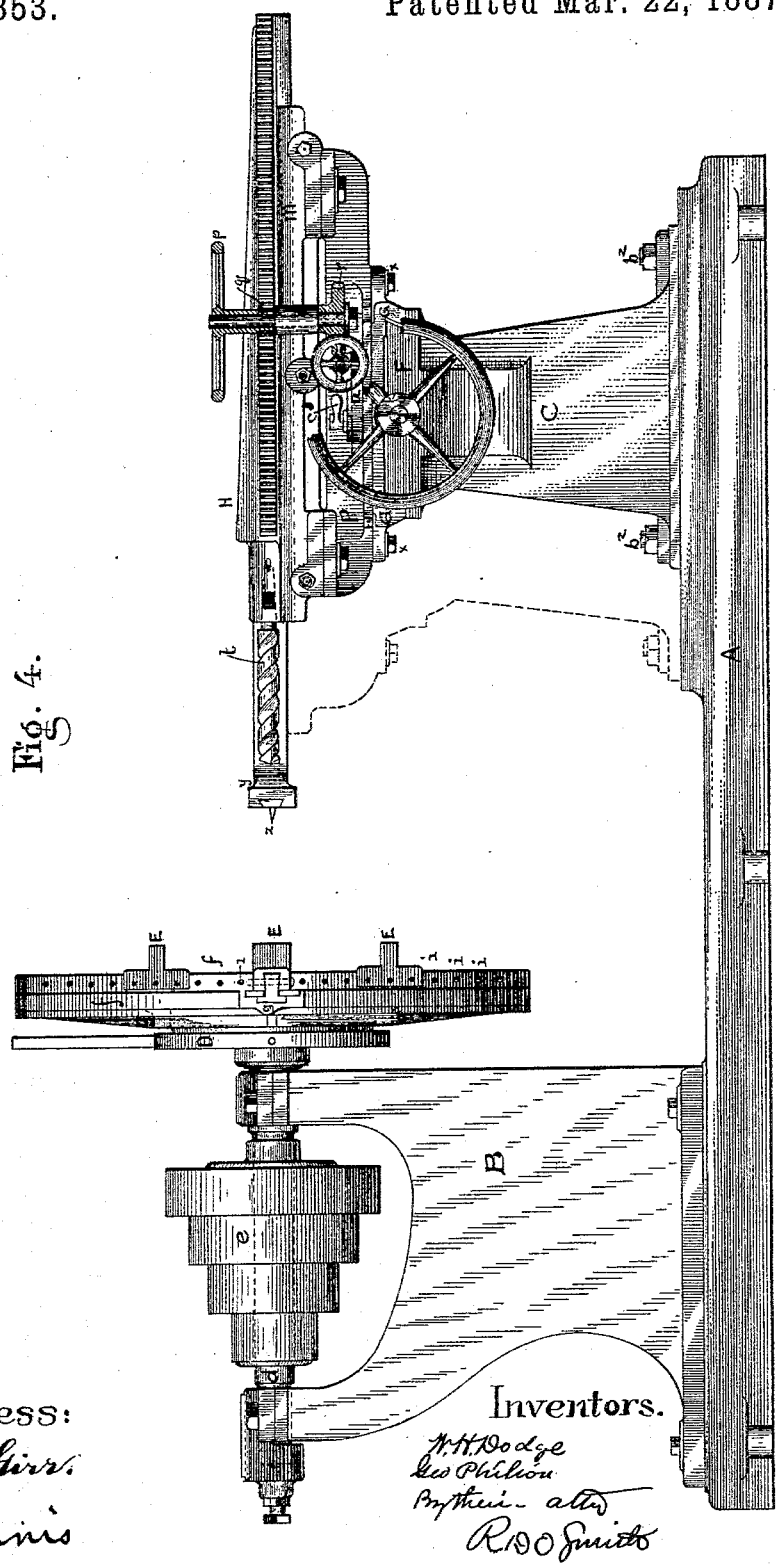

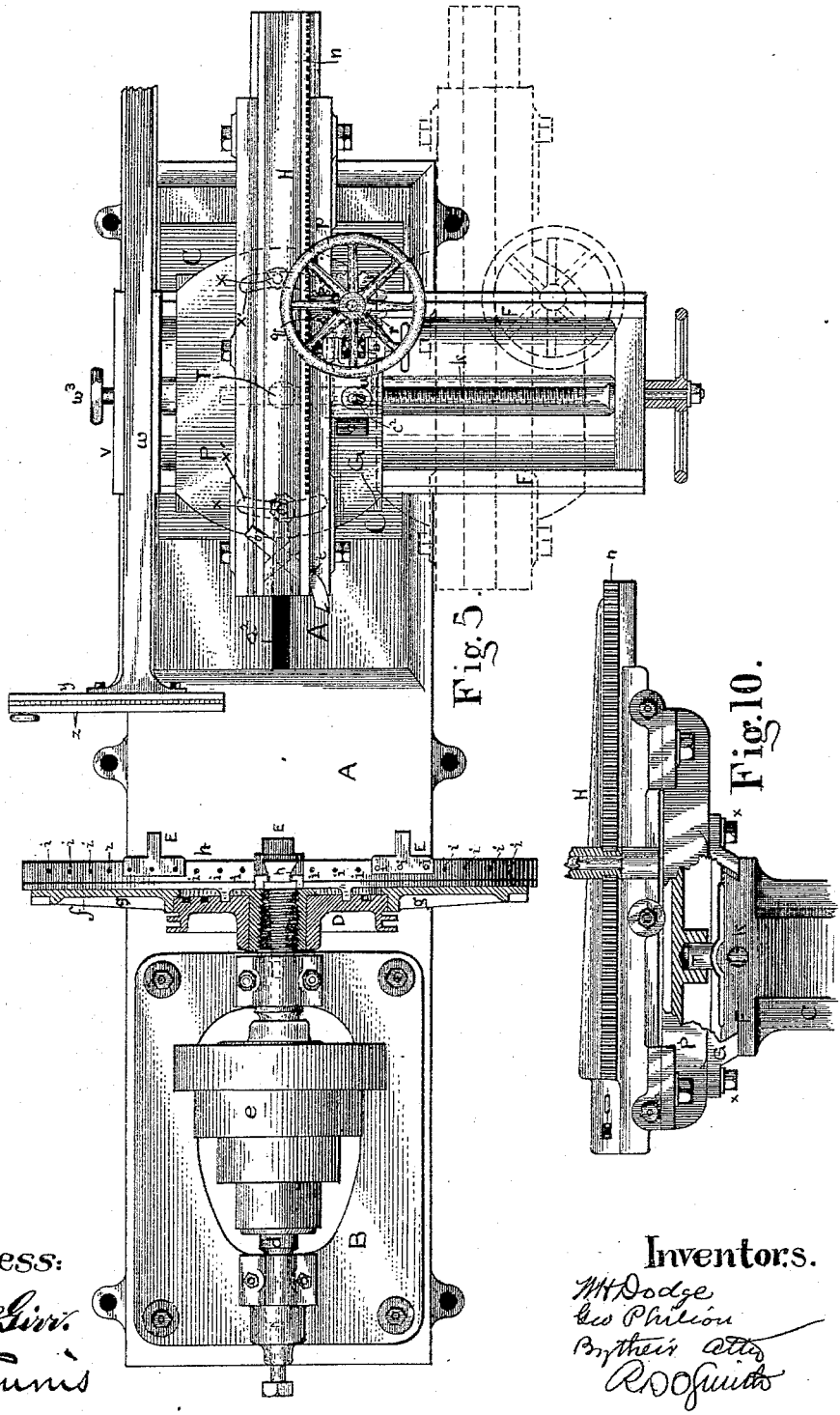

UNITED STATES PATENT OFFICE.

WALLACE H. DODGE AND GEORGE PHILION, OF MISHAWAKA, IND., ASSIGNORS TO THE DODGE MANUFACTURING COMPANY, OF SAME PLACE.

LATHE.

SPECIFICATION forming part of Letters Patent No. 359,853, dated March 22, 1887.

Application filed October 2, 1886. Serial No. 215,136. (No model.)

*To all whom it may concern:*

Be it known that we, WALLACE H. DODGE and GEORGE PHILION, of Mishawaka, in St. Joseph county and State of Indiana, have invented new and useful improvements in lathes for turning and boring wood, and particularly to the turning and center-boring of wooden pulleys; and I do hereby declare that the following is a full and accurate description of the same as we have constructed it for the manufacture of the pulleys named, but without intending to be limited to the exact details shown and described.

In the manufacture of wooden pulleys the rims are "built up" with several rings, each composed of four or more segments cut from suitable boards or planks, the whole being solidly glued together. The blank pulley-rim so constructed is then, as the basis for future operations, turned true and square interiorly. The arms are subsequently inserted. The hub is bored, and the interior periphery is turned off and finished as a final operation.

The first object of our invention is to accurately scribe the exact interior diameter described on the blank-rim; second, to turn the interior surface true to diameter and truly cylindrical; third, after the arms have been inserted, to bore the hub true as to center. Uniformity as to diameter and cylindric surface may be attained, and the manufacture will be facilitated.

Figure 2:
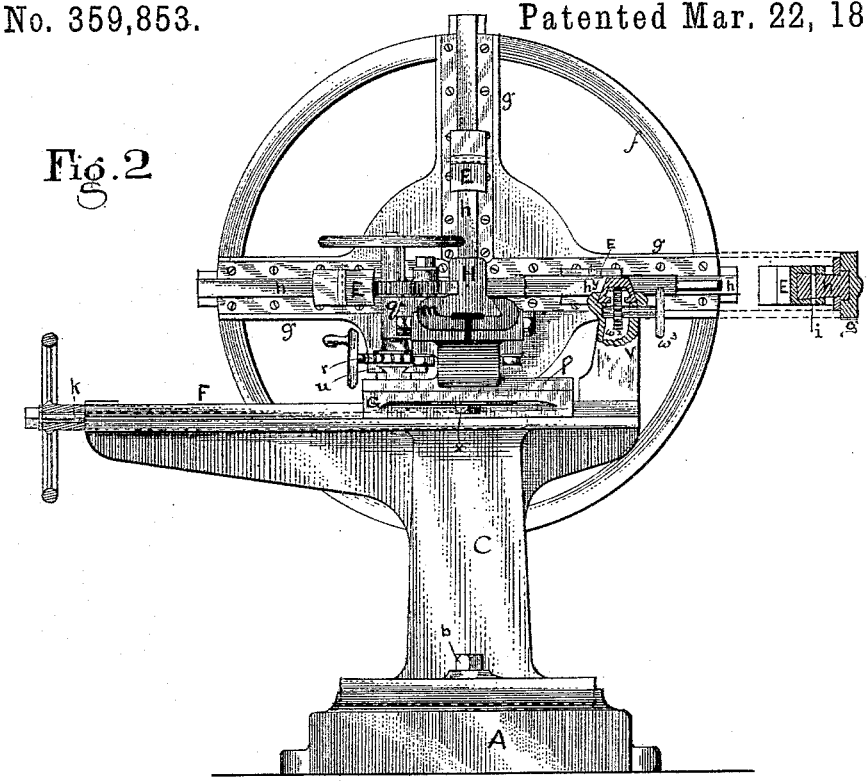
Figure 3:
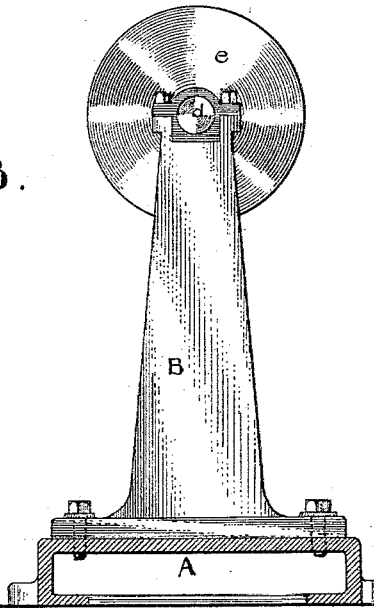

In the accompanying drawings, Figure 1 is a perspective of our invention. Fig. 2 is a front end elevation of the same. Fig. 3 is a rear elevation of the mandrel-post. Fig. 4 is a side elevation of our lathe. Fig. 5 is a plan of the same, the chuck being shown in section. Fig. 6 is an elevation, partly in section, of the worm feed-gear. Fig. 7 is a plan of the same. Figs. 8 and 9 are details of the caliper-scriber. Fig. 10 is an elevation, partly in section, showing the center-pin for the tool-stock carriage.

A is the bed-frame or plate of the machine, to which we prefer to bolt pillars B C, as shown in Figs. 2, 3, 4, and 5,) though said pillars may be bolted directly to the floor, as shown in Fig. 1.

The bed-plate A is provided with a longitudinal slot, $a^2$, to receive the holding-bolts $b^2$, whereby the pillar C is held in place. It is desirable to make only one of said pillars adjustable, and as the pillar B carries the mandrel and band-pulley it is more convenient to fasten it permanently and make the pillar C adjustable. The pillar B supports the mandrel-shaft $d$ for the pulley $e$ and face-plate or chuck E. The pillar C supports the mechanism for scribing, turning the pulley, and boring the hub. The face-plate $f$ may be solid, or a skeleton, as preferred; but we prefer to make as a skeleton frame to make it as light as possible consistent with strength. The radial arms $g$ of the face-plate are each provided with a radial groove, undercut or dovetailed, and bars $h\,h$ are fitted to move therein. The bars $h$ move in radial guides in the face-plate $f$, and at their inner ends are in engagement with the scroll-plate D, which is journaled on the hub of and behind the face-plate, so that rotation of said scroll-plate causes the arms $h\,h$ simultaneously and uniformly to move out or in, as the case may be.

A jaw-piece, E, is fitted to each of the bars $h$ and made adjustable thereon, so that they can be placed nearer to or farther from the center to adapt them to receive and chuck objects of different sizes. It is convenient to attach each jaw E by an undercut or dovetail sliding connection, and provide holes $i$ at stated intervals in each bar $h$, so that the jaws may be shifted and all secured in place equidistant from the center by pins in certain of said holes. Other suitable means for locking the jaws in place may be employed, if preferred, such as clamps, set-screws, &c.

The post C is provided with the horizontal guideway or table F, in direction parallel with the face-plate $f$, and a carriage, P, is mounted on said table to travel on the guide thereof, and a screw, $k$, is placed on said table to move said carriage back and forth and hold it in any position desired.

The carriage P has mounted upon it the tool-stock H, which travels in a guideway, $m$, on said carriage, in the plane of the axis of the shaft $d$, so that when the carriage P is in one position on its guideway the tool $t$, held by the stock H, may move back and forth in a line coincident with said axis, and when said carriage is at any other place on said guide, the tool-stock and its tool will, when moved, travel in a line in the plane of the axis and parallel therewith, so that the tool may be set to bore the center or to cut at any distance therefrom.

On one side of the tool-stock H there is a cog-rack, $n$, and the carriage P is provided with a hand-wheel, $p$, and pinion $q$ in gear with said rack, whereby it may be moved in or out; but when the tool is in action it encounters a continually-changing resistance and the hand-wheel $p$ cannot insure a uniform progress. We have therefore put a worm-gear, $r$, at the bottom of the shaft of the hand-wheel $p$, and provide a worm-screw, $b$, to engage said worm-gear to feed the tool-stock with an unyielding pressure. The bearing for the worm-gear $b$ is mounted on a plate, $u$, which is provided with a hand-lever, $c^3$, and cam $c^2$, or other device, whereby said plate and the worm-screw may be moved into or out of engagement with the pinion $r$ quickly. The hand-wheel $p$ is used to move the tool-stock when the tool is out of action, and the worm-gear, for reasons stated above, is used to move it while in action.

At the rear of the table F there is permanently mounted on said table a guide-frame, V, with a guideway parallel with the guide $m$ and a sliding stock, $w$, therein. This stock $w$ carries at its front end a gage-bar, $y$, graduated in inches or otherwise, to indicate standard measurements from the axis of revolution. It is also provided with a scribing knife or point, $z$, adjustable as to said bar so far that said scribing-blade may be moved to and fixed at any desired point on said bar, and said stock $w$ may then be advanced until said blade engages the surface of the pulley X, or other object held by the chuck-jaws E, and marks thereon a circle of the exact diameter required. This tool is for a guide for setting the turning-tool. For convenience we provide said stock on its under side with a cog-rack, as shown in Fig. 9, and cause the same to engage with a pinion, $w^2$, which is mounted on the shaft of a hand-wheel, $w^3$.

When the pulley-rim X is placed in the chuck-jaws E, if the cutting-tool has not already been set for the exact internal diameter required, the scriber is set at the exact radial distance from the center, and stock $w$ being advanced the required circle is marked on the edge of the pulley-rim. The carriage P is then moved along its guideways F until the cutting-tool exactly reaches said scribed line. The stock H is then advanced by the worm-screw $b$ and gear $r$, and the inner surface of the pulley-rim will be turned out truly cylindrical and of the exact diameter. Thereafter it will not be necessary to use the scriber again until it is necessary to change the tool-stock for a different diameter.

In the manufacture of wooden pulleys the internal face is turned out in the way above described before the arms are inserted. They are then rechucked, placing the rim in the same marks previously made by the jaw E, and thus assuring approximately the same centering, and a boring-tool being placed in the tool-stock H the center hole for the shaft is bored. The exterior surface for the pulley-face may also be turned off in the same way, and by a tool similar to the tool for turning the inside of the pulley-rim.

It is sometimes desirable to cause the tool to travel in a line oblique to the axis of mandrel rotation, so as to produce a conical surface, and we have therefore placed a plate, G, between the carriage P and the guideways of the table F. The plate G has on its under side the gibway to fit the guide F. At its center, on the upper side, it is provided with a center-pin, T. (Shown by dotted lines in Fig. 5 and in Fig. 10.) The carriage turns upon said center-pin, and is provided with clamping-bolts $x$, which extend down through slots $x'$, (shown by dotted lines in Fig. 5,) to clamp said carriage fast to the plate in the desired angular position.

Having described our invention, we claim as new—

1. In a machine for turning the rims and boring the hubs of pulleys and the like, the guideway F, transverse to the axis of rotation, and the scribing-bar mounted to move on the table $v$ in a guideway parallel with said axis, combined with the carriage P, mounted to move on said guideway F, transverse to the axis of rotation, and the tool-stock H, fitted to move on the carriage P in the plane of and parallel with said axis.

2. The reciprocating tool-stock H, provided with the cog-rack $n$, and the hand-wheel $p$, provided with the pinion $q$, combined with the worm-gear $r$ on the shaft of said pinion, and the worm-screw $b$, mounted on the movable plate $u$, substantially as set forth.

3. In a boring and turning machine, a mandrel, a tool-carriage adapted to move in a direction transverse to the axis of revolution of the mandrel, and a scribing-stock having a movement parallel with said axis of revolution, combined with a scribing-blade adjustable on said stock toward or away from said axis of revolution, for the purpose set forth.

4. A machine for turning pulley-rims, boring the hubs and the like, comprising a bed-plate, A, two pillars, B and C, relatively adjustable on said bed-plate, the pillar B being provided with a mandrel, rotating scroll-plate, and face-plate $f$, provided with bars $h$, radially adjustable thereon and controlled by said scroll-plate, and jaws E, adjustable on said bars, and the pillar C being provided with a transverse guideway, F, and a swiveling-carriage and a tool-stock adapted to move thereon toward or away from the face-plate, as set forth.

5. The face-plate $f$, combined with the scroll-plate D, the radial bars $h$ in engagement with said plate and radially adjustable in guides on said face-plate, and the jaws E, adjustable on said bars, whereby with a small and uniform radial movement of said bars the chuck may be adapted to receive and hold blanks of various sizes, and either central or eccentric.

WALLACE H. DODGE.
GEORGE PHILION.

Witnesses:
W. B. HOSFORD,
M. W. MIX.